Sept. 29, 1942.  H. N. WYLIE  2,297,381
ANCILLARY DRIVING MOTOR
Filed Feb. 15, 1941   2 Sheets-Sheet 2
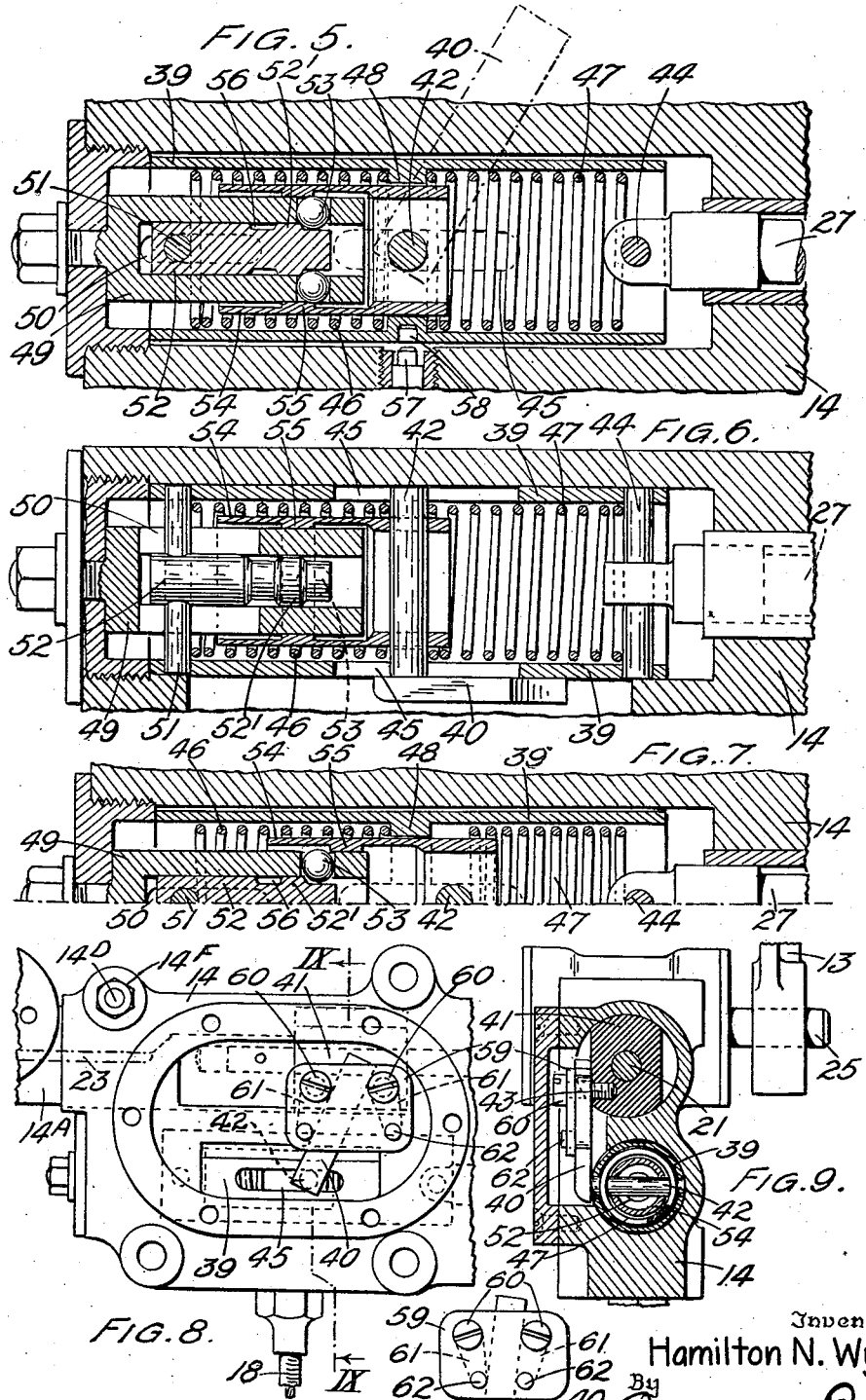
Inventor
Hamilton N. Wylie
By Reynolds Beach
attorneys Patented Sept. 29, 1942

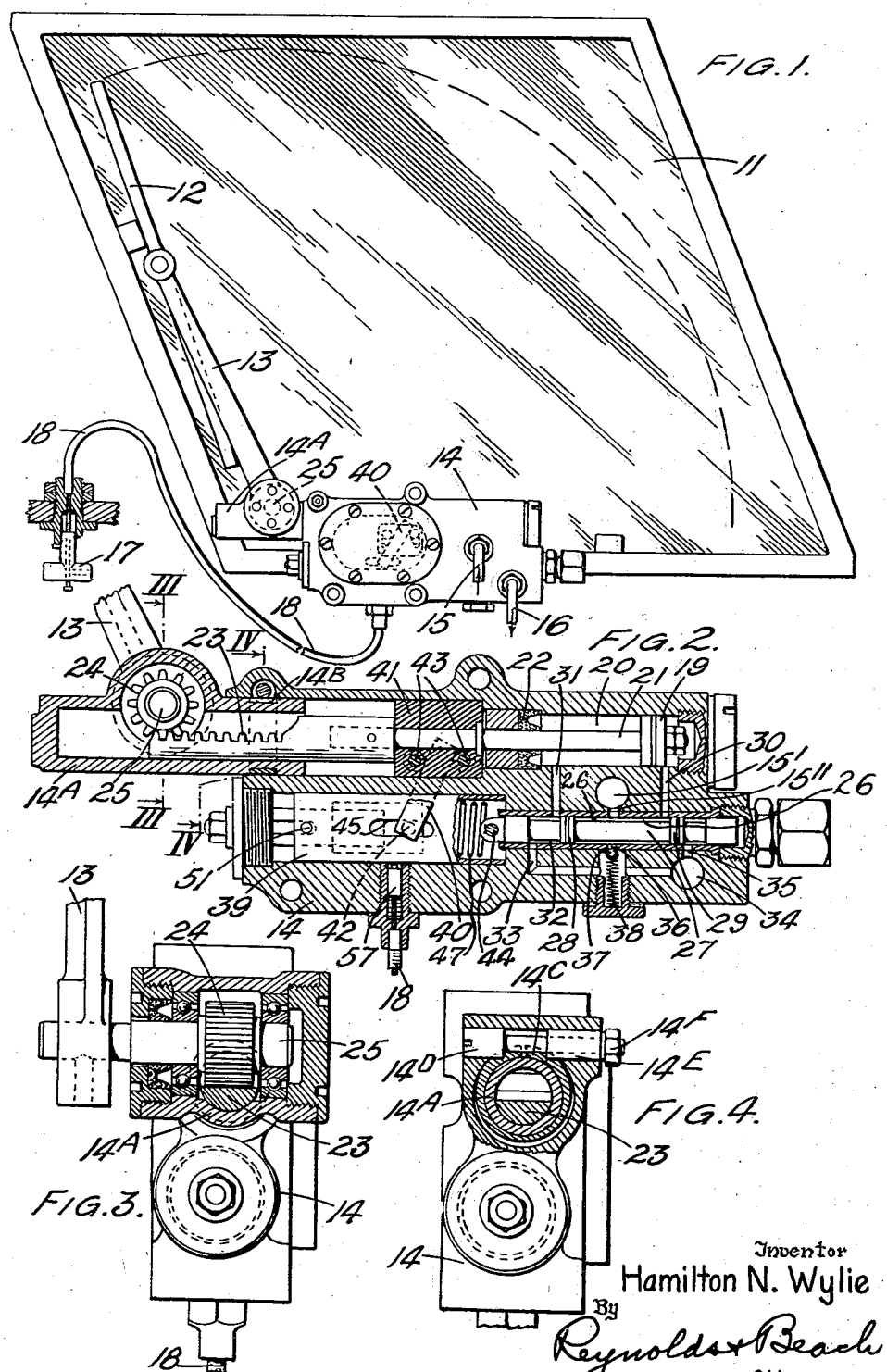

2,297,381

UNITED STATES PATENT OFFICE 2,297,381

ANCILLARY DRIVING MOTOR

Hamilton Neil Wylie, London, England

Application February 15, 1941, Serial No. 379,112
In Great Britain March 5, 1940

18 Claims. (Cl. 121—164)

This invention relates to fluid-actuated motors.

It is an object of the present invention to provide a simple and satisfactory arrangement of fluid-actuated motor in compact form.

The present invention consists in a fluid-actuated motor including an oscillatable piston, a reversing valve having alternative positions each in its turn determining the sense of piston movement, and a tubular housing operatively associated with the reversing valve and enclosing trip mechanism operatively associated with the piston and operable to actuate the reversing valve for effecting reversal of piston movement at the termination of each operative stroke of the piston. In preferred arrangements the motor is actuated by a positive source of fluid pressure—preferably liquid, derived for instance from an engine-driven pump which, in the case of an aircraft or vehicle, may utilize as the source of fluid pressure the oil in the lubricating system of the engine. Such an arrangement has the advantage that the heat derived from the engine oil will effect a considerable heating of the motor which by the nature of its installation is subject to intense cold, and thereby prevent its freezing up in low temperature conditions. It is further contemplated that the motor shall include a pressure relief valve which opens when the motor is deliberately stopped so that a circulation of fluid at a substantial temperature is maintained, the temperature of which is increased by the restricted passage to fluid flow through the relief valve, whether it be derived from the engine lubricating system or from some other source. If the engine lubricating system is employed as the source of fluid pressure supply, the inherent temperature under most operating conditions will provide all the heat required, but if some other source is employed, it may be heated.

In order that it may be clearly understood and readily carried into effect, the invention is hereinafter described with reference to the accompanying diagrammatic drawings, of which:

Figure 1 illustrates an aircraft windscreen with a motor in accordance with the present invention driving an associated windscreen wiper;

Figure 2 is an enlarged sectional elevation of the motor shown in Figure 1;

Figure 3 is a section on the line III—III of Figure 2;

Figure 4 is a section on the line IV—IV of Figure 2;

Figure 5 is a fragmentary sectional elevation illustrating the nature of the release catch through which the reversing valve is actuated at each end of the piston stroke;

Figure 6 is a view taken at right angles to Figure 5;

Figure 7 is, again, a fragmentary detail view corresponding to Figure 5 but showing the valve in a new position;

Figure 8 is a fragmentary side elevation illustrating one arrangement by means of which the stroke of the piston (which is determined by operation of the reversing valve) can be adjusted;

Figure 9 is a section taken on the line IX—IX of Figure 8; and

Figure 10 is a fragmentary view showing the adjustment device in a setting to afford minimum stroke.

Referring now to the drawings, the reference numeral 11 in Figure 1 indicates the windscreen. The windscreen wiper blade 12 is carried by the wiper arm 13, which is driven by a motor, the body of which is indicated at 14. The motor is driven from an available source of fluid pressure, which passes to the motor through the inlet pipe 15 and is returned therefrom through the outlet 16. The reference numeral 17 indicates the operating member for a parking latch 57, later described, which is remotely controllable through the Bowden cable 18 or the like.

It is now convenient for description of the motor to refer to the sectional views illustrated in Figures 2, 3 and 4. Accordingly, the body 14 contains a piston 19, which is driven for reciprocation in the cylinder 20. The piston 19 has a rod 21 which passes through the packing gland 22 for connection to the rack 23. The rack 23 meshes with the pinion 24 directly coupled to the spindle 25 of the windscreen wiper arm 13, and it therefore follows that when the rack 23 is reciprocated the wiper arm 13 sweeps back and forth across the windscreen. The reversing valve stem 27 carries two lands 28 and 29. Driving fluid entering the body 14 through the port 15' fed through the pipe 15 enters the annular space 26 which surrounds the reversing valve stem 27, between the lands there being a communicating passage 15" between the port 15' and the space 26. In the setting shown this space which is closed off by the lands 28 and 29 is in communication with the port 30 which leads to one face of the piston 19, and it may therefore be assumed that if pressure fluid passes to the piston with the reversing valve in the setting illustrated in Figure 2, the piston will move towards the gland 22, with the result that the pinion 24 will be turned clockwise, sweeping the windscreen wiper arm with it accordingly. Return fluid from the cylinder 20 is, in the setting of the valve shown in Figure 2, passed through the body 14 to discharge; through the port 31, annulus 32, port 33; finally passing out of the body through the outlet port 34, to which is connected the outlet pipe 16 seen in Figure 1.

It should now be stated that when reversal of the valve is effected, as will later be understood exactly, the opposite conditions prevail and pressure is applied to the other face of the piston 19 through the port 31, to drive the piston away from the gland 22; return fluid from the cylinder 20 then feeding to discharge through the port 30, round the outer end of the land 29, through the connecting port 35 to the outlet 34.

In addition to the normal outlet for pressure fluid, there is in association with the annulus 26 a port 36 towards which the ball valve 37 is urged by the spring 38. The ball valve is urged from its seating on the port 36 to allow the pressure fluid to pass to the outlet 34 from the space between the lands, and it is intended in preferred arrangements where the pressure fluid is derived from a continuously-available source of pressure that there shall be flow when the motor is deliberately stopped, from the inlet 15' to the outlet 34; while, again, at all times the available pressure shall exceed that actually required for driving the motor effectively. Such an arrangement ensures that at all times there is fluid flow, and therefore a tendency to maintain a temperature in the valve assembly such as will ensure quite appreciable heating of the motor.

Operation of the reversing valve at each end of the stroke of the piston 19 is effected through a spring release catch device the mechanism of which is enclosed within the tubular end part 39 of the valve. The mechanism itself is operatively coupled to the piston rod 21 by the crank 40. Between the packing 22 and the inner end of the rack 23 there is provided a substantial block 41 which reciprocates with the piston rod 21. The crank is pivotally carried upon the crank pin 42, which is spring-loaded in opposite senses, whereas the upper end of the crank is engaged between adjustable stop members, indicated at 43 in Figure 2. The result of that arrangement is that when the block moves axially the crank 40 merely swings about the crank pin 42 until it becomes wedged between the adjustable stop means, as will later be understood whereafter crank movement is locked to compress the spring to effect release and reversal of the reversing valve. The nature of the spring release device will be best understood by reference to Figures 5, 6 and 7 to which it is later proposed to refer in detail.

Referring now to Figure 4, read in conjunction with Figure 2, it will be noted that the wiper arm 13 and pinion 24 on the spindle 25 are carried by a head part 14A at the end of the body 14. The head part 14A is received within, and in fact closes, the bore within which the rack and the block 41 slide. Within the body 14 the head part 14A has a recess which receives a split clamp 14B, which is provided with shoulders 14C. The shoulders 14C are gripped to secure the head 14A by means of the clamp, and gripping is effected by the locking bolt 14D upon which there slides a sleeve 14E, which is tightened up for clamping by means of the lock nut 14F. On release of the lock nut the clamp, which is preferably of a springy character, permits the head 14A to be turned so as to adjust the relationship of the head and associated wiper arm 13 with respect to the body. By reason of the fact that the interconnection between the ball catch release mechanism and the reciprocating piston involves interconnection of the block 41 with the crank pin 42 through the crank 40, the block 41 must not rotate, and to accommodate the rotative angular adjustment of the head 14A, the piston rod 21 and the rack 23 rotate with the head in the block.

Referring now to Figures 5 and 6, it will be noted that the valve stem 27 has an end lug through which a pin 44 passes to secure the spindle to the tubular end part 39. The tubular end part 39 may therefore be regarded as though it were integral with the valve stem 27, and is slotted as indicated at 45 so that the crank pin 42 can move axially to a limited extent. Compression springs 46 and 47 bear under compression against the crank pin 42 and a central internal rib 48, extending internally of the tubular end part 39. Entering the tubular end part 39 remote from the valve stem 27 is a fixed sleeve 49, which is itself slotted, as indicated at 50, to receive a pin 51 connecting the tubular end part 39 of the reversing valve to an internal projection 52. The interconnection between the parts 39 and 52 ensures that the latter moves axially with the former, sliding within the fixed sleeve part 49. The fixed sleeve part 49 is apertured for the recetion of ball catches 53 which are prevented from falling into the fixed sleeve by the formation of the projection 52. Outward movement of the balls 53 is restrained by means of the intermediate sleeve 54 which has an internal rib 55, the purpose of which will shortly become apparent.

So long as the crank 40 engages freely between the adjustable stops 43 it merely swings angularly about the crank pin 42 without materially affecting either of the compression springs 46 or 47. At the end of each operative stroke of the piston, however, three-point contact is established (between the points 43, 43 and either of the members 61), and further movement of the crank results in its being moved bodily, taking the crank pin 42 with it to compress one or other of the springs 46 or 47 against the pin 44 or the pin 51, as the case may be, according to the direction of movement. The pins 44 and 51 thus virtually provide anchorages for the respective springs 46 and 47. Immediately the crank pin 42 starts to move, the intermediate sleeve portion 54 must move with it, and when the intermediate sleeve 54 has moved far enough for the rib 55 to clear the balls 53, the balls ride up, allowing the enlargement 52' to snap past the balls. Thus, if the spring 47 be regarded as being compressed between the pins 42 and 44 by crank pin movement, the parts 39 and 52 cannot move until the rib 55 has cleared the balls, but immediately the balls are free the spring is released, taking with it the tubular end part 39 of the valve and the projection 52 to effect reversal of the valve and the balls then rest in the recesses 56 ready for the same release action to occur in the reverse sense at the other end of the piston stroke.

Whereas in Figures 5 and 6 the rib 55 is still maintaining the balls 53 located in locking engagement with the enlargement 52', Figure 7 shows the parts immediately prior to release, it being assumed that the crank pin 42 is moving to the right. It will be seen from Figure 7 that the intermediate sleeve 54 has moved under the influence of movement of the crank pin 42 until the rib 55 has cleared the balls. Movement of the intermediate sleeve 54 to the right has occured, and the spring 47 is compressed between the crank pin 42 and the pin 44, ready to shoot the tubular end part 39 of the reversing valve, together with the projection 52, also to the right.

Figure 5 also illustrates in detail the remotely controllable spring-loaded parking latch 57 which is actuated by the remote control cable 18 (see Figure 1). The movable latch part snaps into a depression 58 formed in the tubular end part 39 of the valve and locks the part 39 at the left-hand end of its stroke and no reciprocation of the piston 19 and wiper arm 13 can then occur until the latch 57 is released from the depression 58.

Referring now to Figures 8, 9 and 10, it may be regarded that Figure 8 shows a portion of the body 14 with a cover plate removed to provide access to the means for adjusting the stroke of the piston, and consequently the wiper arm. It will have been realised that the length of piston stroke is determined by the delay which occurs between successive actuations of the reversing valve. Likewise, it will have been realised that so long as the crank 40 is allowed to swing about the crank pin 42 the reversing valve remains unaffected. The adjustment is therefore concerned with providing means for limiting the swinging of the crank pin as the piston 19 is reciprocated. The adjustment device therefore comprises a plate 59 secured to the block 41 by the screw heads 60 (which are in fact the heads of the screws 43 seen in Figure 2). The screw heads 60 also serve to secure adjustable abutments 61, which can be swung angularly about the screws 43 on release of the screws, and eventually secured in an adjusted position by tightening the screws 43. The abutments 61 may include pegs 62, and these may be used to locate and lock the pieces 61 in their predetermined positions, preferably by engaging suitably-placed holes in the plate 59 to receive the pegs 62 and the screws 60. The crank 40 is received between the screw heads 60, and therefore also passes between the abutments 61. Swinging of the crank 40 therefore continues as the piston reciprocates until such time as the crank becomes locked against further swinging, by engagement with one of the abutments 61, in addition to its mere locating engagement between the screw or slot member 43, whereafter swinging is prevented and the crank 40 then moves bodily, taking with it the crank pin 42 to compress the appropriate spring. As shown in Figure 8, the crank has been engaged by the left-hand abutment 61 so that the crank pin will then move to the right, compressing the spring 47.

Figure 9 is merely a section on the line IX—IX of Figure 8 and renders more clear the nature of the adjustment device and interconnection between the plate 59 and the block 41.

Whereas in Figure 8 the adjustment of the abutments 61 provides for a fairly long stroke of the piston, the setting shown in Figure 10 provides practically the minimum stroke, for it will be obvious that a very short piston movement brings the crank into full engagement with the abutments 61 and the ball-catch release is operated very quickly before the piston is able to continue its stroke for anything like its maximum.

Though in the arrangement illustrated the motor has been shown coupled to a windscreen wiper which reciprocates, there is no reason why the driven element should not rotate unidirectionally, and if such a form of drive were required, a pawl-and-ratchet device could be associated with the pinion 24, but movement of the driven member would then necessarily be intermittent.

What I claim is:

1. A fluid-pressure actuated motor including a piston oscillatable between two end positions, a valve reversible in its position, at each end of the piston's travel, to effect reversal of the sense of piston movement, a pair of spaced-apart abutments movable with the valve and an intermediate abutment movable with the piston, two springs disposed for alternative loading, according to the sense of piston travel, one between the intermediate abutment and each of the other abutments, valve-locking means including a lock member shiftable with the valve, and a fixedly positioned detent movable into engagement with said lock member in each of two positions of the lock member, corresponding to each of the two valve positions, and a retainer normally engageable with said detent to retain the latter in valve-locked position during loading of either spring, and shiftable by the piston, when the latter reaches an end position, to a releasing position, for release of the detent and snap shifting of the valve and its associated abutments and lock member to the reversed position, and re-engagement of the detent in the new position with the lock member.

2. A fluid-pressure actuated motor as in claim 1, wherein the lock member is formed with two spaced-apart shoulders with which the detent is alternatively engageable, and wherein the detent is guided for radial movement only, to enable engagement with and disengagement from said shoulders, and wherein a sleeve disposed coaxially of the lock member, and surrounding the latter and the detent, constitutes the retainer, said sleeve being internally relieved, at spaced points, to permit radial shifting of the detent when in registry with such relieved points.

3. A fluid-pressure actuated motor as in claim 1, wherein the lock member is formed with two spaced-apart shoulders with which the detent is alternatively engageable, a fixed sleeve surrounding the lock member and apertured for radial movement only of the detent, and wherein the retainer is formed as a sleeve coaxial with and surrounding the fixed sleeve, and being internally relieved at spaced points, to permit radial movement of the detent from engagement with one such shoulder, and consequent axial shifting of the valve and the lock member, for engagement of the detent with the other shoulder of the lock member, but only when the detent registers with such a relieved portion of the retainer sleeve.

4. A fluid-pressure actuated motor as in claim 1, including a tubular extension of the valve, enclosing the springs, and longitudinally apertured intermediate its ends for axial movement of the intermediate abutment, the spaced-apart abutments being secured at the ends of the tubular extension, a fixed sleeve longitudinally slotted, and disposed coaxially within one end of the tubular extension, and radially apertured for the reception of the detent, the latter comprising a pair of diametrally disposed balls, the lock member comprising a plug within the fixed sleeve operatively secured, through the slots in the fixed sleeve, for movement with the tubular extension, and having two spaced shoulders to engage the detent balls, the retainer comprising an axially movable sleeve closely surrounding the fixed sleeve to prevent radial movement of the detent balls from shoulder-engaging position, but internally relieved at spaced points to permit such radial movement, and consequent shifting of the valve, tubular extension, and lock member to its alternative position, and means operatively connected for movement with the piston, and constituting means operatively connected to the intermediate abutment to shift the latter in accordance with the piston's movement.

5. A fluid-pressure actuated motor as in claim 1, including also means intermediate the piston and the retainer adjustable to determine the point in the piston's travel at which the detent is released, and consequently to determine the end points of the piston's travel.

6. A fluid-pressure actuated motor as in claim 1, including means interconnecting the piston and the retainer, for shifting the latter as the piston approaches a desired end position, and means to adjust said interconnecting means, to effect shifting of the retainer, and consequent reversal of the valve, at different selected end positions in the piston's travel.

7. A fluid-pressure actuated motor as in claim 1, including a crank arm carried by the retainer, and a pair of stop pegs movable with the piston, and spaced apart to engage opposite sides of the crank arm and to shift the retainer thereby, said pegs being adjustable in spacing to effect shifting of the retainer, and consequent reversal of the valve and the piston, at different selected points in the piston's travel.

8. A fluid-pressure actuated motor as in claim 1, including a crank arm operatively connected to move axially with the piston, and extending transversely to an operative connection with the intermediate abutment, and means interposed between said crank arm and the piston for adjustment of the crank arm angularly about the piston's axis.

9. A fluid-pressure actuated motor as in claim 1, including a crank arm pivotally connected to the intermediate abutment, and extending transversely of the valve's axis, and a block rotative about the piston's axis and operatively connected to be moved axially by the piston, and means operatively connecting the block and the crank arm for bodily shifting of the latter.

10. A fluid-pressure actuated motor as in claim 1, including a crank arm pivotally connected to the intermediate abutment, and extending transversely of the valve's axis, and a block rotative about the piston's axis and operatively connected to be moved axially by the piston, and a pair of stop pegs supported from the block at opposite sides of the crank arm, and adjustable towards and from the latter, to effect bodily shifting of the crank arm at selected points in the piston's travel.

11. A fluid-pressure actuated motor including a reciprocable piston, a valve reversible in its position, at each end of the piston's travel, to effect reversal of the sense of the piston's movement, a pair of spaced-apart abutments movable with the valve and an intermediate abutment movable with the piston, two springs disposed for alternative compression, one between the intermediate abutment and each of the other abutments, according to the sense of piston travel, valve locking means including a radially movable but axially fixed detent and a lock member movable axially with the valve and provided with alternative recesses for the reception of said detent in either of two valve-locking positions, and a sleeve surrounding the detent and its associated recessed lock member, said sleeve being operatively connected for movement with the piston, and being formed to restrain radial movement of the detent from valve-locking position during the central portion of the piston's movement, but being recessed to permit such radial movement of the detent, and consequent shifting of the valve and lock member under the influence of the compressed spring, at each end of the required piston travel.

12. A fluid-pressure motor including a piston oscillatable between two end positions, a valve reversible in its position, at each end of the piston's travel, to effect reversal of the sense of piston movement, trip mechanism including spring means loaded by movement of the piston in each sense to effect reversal of the valve to initiate movement in the opposite sense, locking means to retain the trip mechanism against release, a sleeve enclosing the locking means, said sleeve and the locking means being relatively formed and arranged to retain the locking means in locked position during the operative stroke of the piston, and to release the locking means, and means operatively connecting said sleeve and the piston to shift said sleeve into lock-releasing position at each end of such operative stroke.

13. A fluid-pressure motor as in claim 12, characterized in that the operative connection between the sleeve and the piston includes means adjustable to effect shifting of the sleeve into lock-releasing position at various selected points in the piston's travel, to vary the effective operative stroke of the piston.

14. A fluid-pressure motor as in claim 12, wherein the trip mechanism includes further a tubular housing operatively connected to the valve and enclosing the sleeve, and having two spaced abutments, the sleeve having an intermediate abutment between which and the first two abutments the spring means are interposed.

15. A fluid-pressure motor as in claim 12, wherein the trip mechanism includes further a tubular housing operatively connected to the valve and enclosing the sleeve, and having two spaced abutments, the sleeve having an intermediate abutment between which and the first two abutments the spring means are interposed, a crank mounted for bodily movement with the piston, and for pivotal movement relative to the piston, and two stops disposed at opposite sides of the crank and movable bodily with the piston, and adjustable towards and from the crank to variably limit its pivotal movement, said crank being connected to the sleeve and constituting, with said stops, the operative connection between the piston and sleeve.

16. A fluid-pressure motor as in claim 12, including means to latch the valve against reversal, and a relief valve between the inlet to and outlet from the piston-controlling valve, spring-loaded to open for continued circulation of pressure-fluid while the piston controlling valve is latched.

17. A fluid-pressure motor including a piston reciprocable within a cylinder between two end positions, a rack reciprocable with the piston and a meshing driven gear on a transverse spindle, a valve disposed parallel to the piston and reversible, at each end of the piston's travel, to effect reversal of the sense of piston movement, trip mechanism operatively connected between the valve and the piston to control the reversal of the valve at given points in the piston's travel, said trip mechanism including an arm mounted for bodily movement with the piston and extending transversely towards, and operatively connected to, the valve, a block mounted for bodily movement with the piston, but rotatable about the latter's axis, for rotative adjustment of the rack and its gear around the piston's axis, relative to the block, and stops carried by said block and engageable with the arm to transmit a reversing force from the piston to the valve, through said arm, regardless of the rotated position of the gear.

18. A fluid-pressure motor as in claim 17, characterized in that the gear and its spindle are journaled in a tubular head, said tubular head being mounted in the motor coaxially of and rotatable with respect to the piston and cylinder, and the block is connected to the valve by a connection such as interdicts rotation of the block with the piston, rack, gear, and tubular head.

HAMILTON NEIL WYLIE.